(12) United States Patent
Yuan et al.

(10) Patent No.: US 8,787,130 B1
(45) Date of Patent: Jul. 22, 2014

(54) SYSTEMS AND METHODS FOR PROVIDING HEAT ASSISTED MAGNETIC RECORDING MEDIA CONFIGURED TO COUPLE ENERGY FROM A NEAR FIELD TRANSDUCER

(71) Applicant: WD Media, LLC, San Jose, CA (US)

(72) Inventors: Hua Yuan, Fremont, CA (US); Bogdan F. Valcu, Fremont, CA (US); Antony Ajan, Santa Clara, CA (US); B. Ramamurthy Acharya, Fremont, CA (US); Alexander S. Chernyshov, San Jose, CA (US); Paul C. Dorsey, Los Altos, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 13/931,812

(22) Filed: Jun. 29, 2013

Related U.S. Application Data

(60) Provisional application No. 61/788,254, filed on Mar. 15, 2013.

(51) Int. Cl.
*G11B 11/00* (2006.01)
*G11B 5/82* (2006.01)
*G11B 5/66* (2006.01)

(52) U.S. Cl.
USPC ........ 369/13.33; 360/135; 428/828; 428/831; 428/836

(58) Field of Classification Search
None
See application file for complete search history.

(56) References Cited

U.S. PATENT DOCUMENTS

| | | | |
|---|---|---|---|
| 5,045,165 | A | 9/1991 | Yamashita |
| 5,567,512 | A | 10/1996 | Chen et al. |
| 5,603,766 | A | 2/1997 | Visokay et al. |
| 5,679,431 | A | 10/1997 | Chen et al. |
| 5,824,409 | A | 10/1998 | Sellmyer et al. |
| 6,007,623 | A | 12/1999 | Thiele et al. |
| 6,086,730 | A | 7/2000 | Liu et al. |
| 6,086,974 | A | 7/2000 | Thiele et al. |
| 6,136,403 | A | 10/2000 | Prabhakara et al. |
| 6,139,907 | A | 10/2000 | Sellmyer et al. |
| 6,183,606 | B1 | 2/2001 | Kuo et al. |
| 6,565,719 | B1 | 5/2003 | Lairson et al. |
| 6,599,646 | B2 | 7/2003 | Suzuki et al. |
| 6,716,516 | B2 | 4/2004 | Futamoto et al. |
| 6,824,817 | B2 | 11/2004 | Araki et al. |

(Continued)

FOREIGN PATENT DOCUMENTS

WO 2008030199 3/2008

OTHER PUBLICATIONS

Weller el al., "High Ku Materials Approach to 100 Gbits/in2", IEEE Trans. On Magnetics, vol. 36, No. 1, Jan. 2000, pp. 1-6.

(Continued)

*Primary Examiner* — Thang Tran (57) ABSTRACT

Systems and methods for providing heat assisted magnetic recording (HAMR) media configured to couple energy from a near field transducer (NFT) are provided. One such method includes providing a magnetic recording layer including an L10 ordered FePt or an L10 ordered CoPt, selecting a plurality of preselected parameters for a coupling layer, the preselected parameters including a material, a preselected deposition temperature, and a preselected thickness, and depositing the coupling layer directly on the magnetic recording layer using the preselected parameters such that the coupling layer has an extinction coefficient greater than 0.1.

31 Claims, 4 Drawing Sheets

(56) References Cited

U.S. PATENT DOCUMENTS

| | | | |
|---|---|---|---|
| 6,846,583 | B2 | 1/2005 | Inaba et al. |
| 7,241,520 | B2 | 7/2007 | Shin et al. |
| 7,282,278 | B1 | 10/2007 | Nolan |
| 7,286,324 | B2 | 10/2007 | Yasui et al. |
| 7,687,157 | B2 * | 3/2010 | Berger et al. ............... 428/828 |
| 2002/0041980 | A1 | 4/2002 | Suzuki et al. |
| 2004/0110035 | A1 | 6/2004 | Shin et al. |
| 2004/0185307 | A1 | 9/2004 | Oikawa et al. |
| 2004/0191578 | A1 | 9/2004 | Chen et al. |
| 2006/0177703 | A1 * | 8/2006 | Takenoiri et al. ............ 428/829 |
| 2006/0188743 | A1 | 8/2006 | Seki et al. |
| 2007/0026262 | A1 | 2/2007 | Maeda |
| 2007/0072011 | A1 | 3/2007 | Li et al. |
| 2008/0180827 | A1 * | 7/2008 | Zhu et al. ..................... 360/59 |
| 2008/0311430 | A1 | 12/2008 | Chen et al. |
| 2009/0061259 | A1 * | 3/2009 | Lee et al. ..................... 428/828 |
| 2011/0311841 | A1 * | 12/2011 | Saito et al. .................. 428/848.1 |

OTHER PUBLICATIONS

Yu-Nu Hsu et al., "The effects of Ag underlayer and Pt intermediate layers on the microstructure and magnetic properties of epitaxial FePt thin fims," Journal of Magnetism and Magnetic Materials 260, 2003, pp. 282-294.

* cited by examiner

“SYSTEMS AND METHODS FOR PROVIDING HEAT ASSISTED MAGNETIC RECORDING MEDIA CONFIGURED TO COUPLE ENERGY FROM A NEAR FIELD TRANSDUCER

CROSS-REFERENCE TO RELATED APPLICATION

This application claims priority to and the benefit of U.S. Provisional Application No. 61/788,254, filed on Mar. 15, 2013, entitled, "SYSTEMS AND METHODS FOR PROVIDING MEDIA CONFIGURED TO COUPLE ENERGY FROM NEAR FIELD TRANSDUCERS IN HEAT ASSISTED MAGNETIC RECORDING MEDIA", the entire content of which is incorporated herein by reference.

FIELD

The present invention relates generally to magnetic recording systems, and more specifically to systems and methods for providing heat assisted magnetic recording (HAMR) media configured to couple energy from a near field transducer (NFT).

BACKGROUND

Energy/Heat Assisted Magnetic Recording (EAMR/HAMR) systems can potentially increase the areal density of information recorded magnetically several times, avoiding data erasure caused by thermal fluctuations, by using high-coercivity media materials. More specifically, granular high magnetocrystalline anisotropy (Ku) L10 (i.e., L10) ordered FePt media is thought to be best suited for areal density beyond 1 terabit per inch squared magnetic recording. In HAMR systems, a slider including a write element and a light emitting near field transducer (NFT) is positioned adjacent to the media. However, the HAMR media is often designed to maximize areal density and not necessarily to efficiently couple light from the NFT. Thus, a system and method for providing a HAMR media that efficiently couples energy from an NFT is needed.

DETAILED DESCRIPTION

Some heat assisted magnetic recording (HAMR) media include an overcoat layer, a hard magnetic recording layer (L10 FePt), underlayers (UL), a heatsink layer and an adhesion layer. A proper overcoat layer can be important to ensure high media coercivity (Hc) without damage, good light absorption, and writability desired for an optimum magnetic recording system. For some comparative HAMR media and/or PMR media designs, the overcoat layer consists of a relatively thick layer of carbon deposited using chemical vapor deposition (CVD) and then a layer of thin carbon deposited on the CVD carbon. However, the CVD carbon is generally non-transparent (often with, for example, an extinction coefficient (k) of about 0), and thus does not efficiently absorb light energy from a near field transducer (NFT) in an adjacent HAMR head. As a result, the energy coupling of the NFT is inefficient and poor.

Referring now to the drawings, embodiments of systems and methods for providing HAMR media with a tuned coupling layer that are configured to couple energy from an NFT are illustrated. In several embodiments, methods involve selecting parameters for the tuned coupling layer, where the parameters include material(s), a preselected deposition temperature, and a preselected thickness, and depositing the coupling layer directly on a magnetic recording layer made of an L10 ordered FePt, an L10 ordered CoPt, or an L10 ordered FePd using the preselected parameters. The preselected parameters can be selected such that the carbon layer has an extinction coefficient greater than 0.1 for a range of wavelengths expected for a light source applied to the NFT. In some embodiments, the coupling layer includes one or more materials selected from the group including Ta, Pt, Ru, Ag, Au, Cu, Al, NiTa, C, SiC, SiN, TiC, and/or TiN. In one such case, the coupling layer is made of sputtered carbon, and the coupling layer may then be referred to as a flash carbon layer.

In some embodiments, the systems involve HAMR media with a magnetic recording layer made of an L10 ordered FePt, an L10 ordered CoPt, or an L10 ordered FePd and a coupling layer directly on the magnetic recording layer and deposited using preselected parameters including a preselected temperature and a preselected thickness of the coupling layer, where the coupling layer (e.g., tuned coupling layer) has an extinction coefficient greater than 0.1 for a range of wavelengths expected for a light source applied to the NFT.

The HAMR media with the coupling layer (e.g., flash carbon with tuned parameters in one aspect) can present a number of advantages, including a significantly improved media signal to noise ratio or SNR during magnetic recording. The improved HAMR media can also enhance light absorption, write capability, and reduce damage to the magnetic layer in HAMR media by avoiding a CVD deposition process or similar deposition process involving application of a bias voltage to the media substrate. This improves recording SNR characteristics and reduces the laser power for optimum recording. In some embodiments, the coupling layer is deposited at a temperature of about 90 to about 150 degrees Celsius (C). In some embodiments, coupling layer has a film thickness of about 1.5 to 8 nanometers. In several embodiments, the new HAMR media design can be implemented without increasing costs for existing manufacturing processes.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

Figure 1:
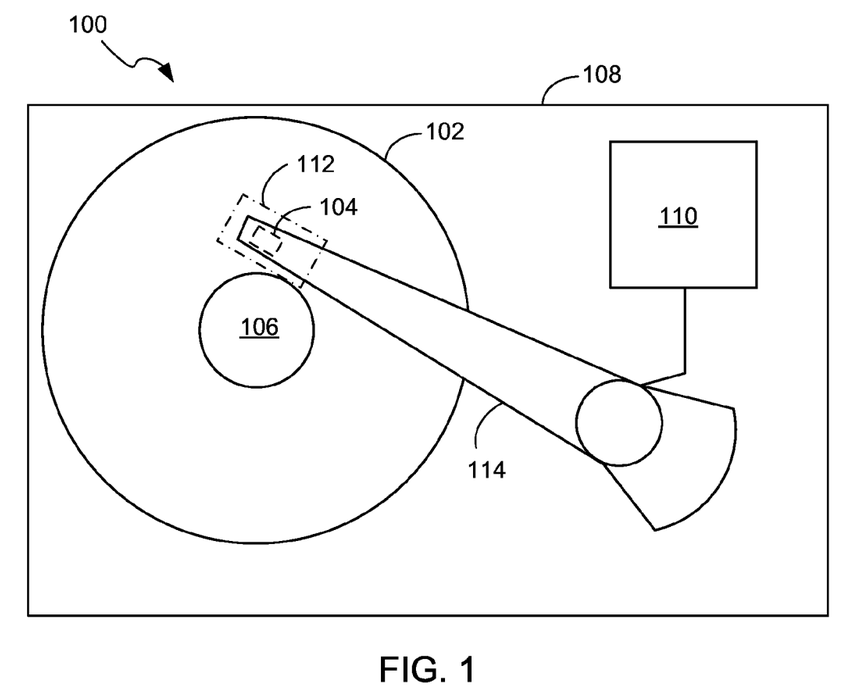
FIG. 1 is a top schematic view of a disk drive configured for heat assisted magnetic recording (HAMR) and including a magnetic medium with a tuned coupling layer configured to efficiently couple energy from a near field transducer (NFT) in accordance with one embodiment of the invention.

FIG. 1 is a top schematic view of a disk drive 100 configured for heat assisted magnetic recording (HAMR) and including a magnetic medium 102 with a tuned coupling layer (not visible in FIG. 1 but see FIG. 3) configured to efficiently couple energy from an NFT in accordance with one embodiment of the invention. The NFT 104d (not visible in FIG. 1 but see FIG. 2) is positioned within a head/slider 104. Disk drive 100 may include one or more disks/media 102 to store data. Disks/media 102 reside on a spindle assembly 106 that is mounted to drive housing 108. Data may be stored along tracks in the magnetic recording layer of disk 102. The reading and writing of data is accomplished with the head 104 that has both read and write elements (not visible in FIG. 1 but see 104b and 104a, respectively, in FIG. 2). The write element 104a is used to alter the properties of the magnetic recording layer of disk 102 and thereby write information thereto. In one embodiment, head 104 may have magneto-resistive (MR), or giant magneto-resistive (GMR) elements. In an alternative embodiment, head 104 may be another type of head, for example, an inductive read/write head or a Hall effect head.

In operation, a spindle motor (not shown) rotates the spindle assembly 106, and thereby rotates disk 102 to position head 104 at a particular location along a desired disk track. The position of head 104 relative to disk 102 may be controlled by position control circuitry 110. Selected components 112 of the HAMR system, including the slider 104, are positioned near an end of a suspension arm 114 that supports slider 104.

The media 102 includes a tuned coupling layer deposited directly on the recording layer at a preselected temperature and a preselected film thickness such that the extinction coefficient (k) is greater than 0.1 for a range of wavelengths of the applied light (e.g., range from about 820 nm to about 840 nm). In several embodiments, the tuned coupling layer can include material(s) such as Ta, Pt, Ru, Ag, Au, Cu, Al, NiTa, C, SiC, SiN, TiC, TiN, and/or other suitable materials. In some embodiments, the media 102 further includes a lubricant layer directly on the coupling layer. As discussed above and in further detail below, the media with the tuned coupling layer (e.g., flash carbon layer in one aspect), and without the CVD carbon of comparative media designs, can provide a number of benefits including improved signal to noise performance for the media.

Figure 2:
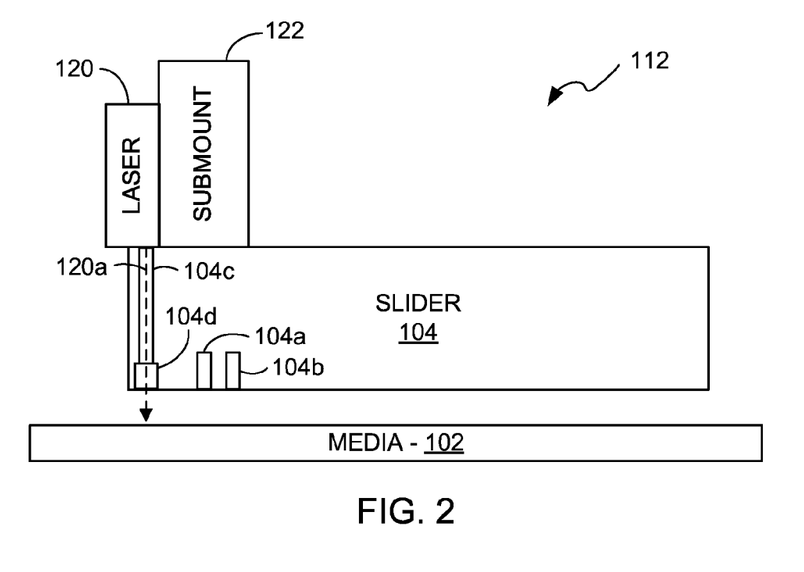
FIG. 2 is a side cross sectional schematic view of selected components of the HAMR system of FIG. 1 including the magnetic medium with the tuned coupling layer configured to efficiently couple energy from an NFT in accordance with one embodiment of the invention.

FIG. 2 is a side cross sectional schematic view of selected components 112 of the HAMR system of FIG. 1 including the magnetic medium 102 with the tuned coupling layer (not visible in FIG. 1 but see FIG. 3) configured to efficiently couple energy from an NFT 104d in accordance with one embodiment of the invention. The HAMR system components 112 also include a sub-mount 122 attached to a top surface of the slider 104. The laser diode (e.g., light source) 120 is attached to the sub-mount 122, and possibly to slider 104. The slider 104 includes the write element 104a and the read element 104b positioned along a bottom air bearing surface (ABS) of the slider 104 for writing information to, and reading information from, respectively, the media 102. The slider also includes a waveguide 104c and an NFT 104d positioned along the ABS.

In operation, the laser diode 120 is configured to direct light energy 120a to the waveguide 104c which directs the light to the NFT 104d. Upon receiving the light 120a from the laser diode via the waveguide 104c, the NFT 104d generates localized heat energy that heats a portion of the media 102 near the write element 104a and the read element 104b. As the media 102 includes the light absorptive tuned coupling layer, the heat energy (e.g., light energy) of the NFT is efficiently transferred to the media 102 in the local area. In several embodiments, the laser diode 120 emits light at one or more preselected wavelengths. In such case, the preselected parameters of the tuned coupling carbon layer including, for example, the material(s), the preselected deposition temperature, and the preselected thickness are selected to ensure particular index of refraction (n) and extinction coefficient (k) values that correlate to maximized light absorption at the one or more preselected wavelengths of the laser diode.

FIGS. 1 and 2 illustrate a specific embodiment of a HAMR system. In other embodiments, the new HAMR media with the tuned coupling layer can be used in other suitable HAMR systems.

Figure 3:
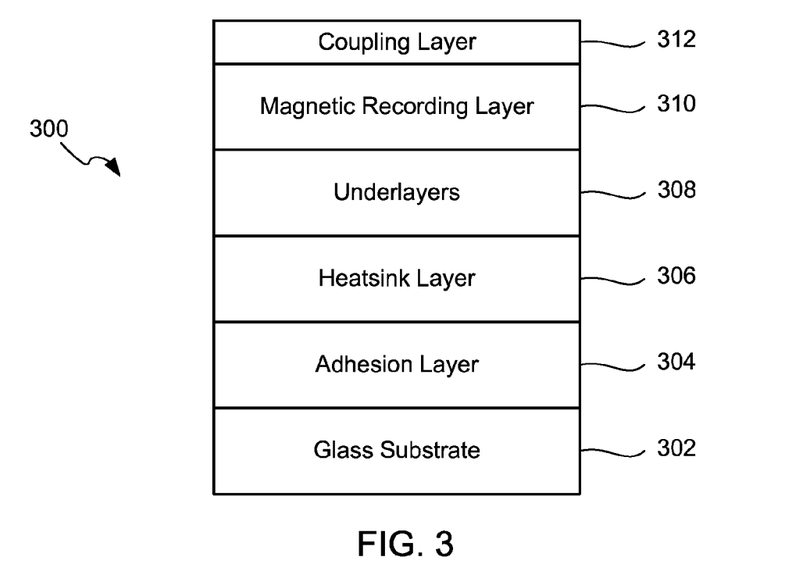
FIG. 3 is side cross sectional view of a magnetic medium with a tuned coupling layer on a magnetic recording layer, where the medium is configured to efficiently couple energy from an NFT in accordance with one embodiment of the invention.

FIG. 3 is side cross sectional view of a magnetic medium 300 with a tuned coupling layer 312 on a magnetic recording layer 310, where the medium 300 is configured to efficiently couple energy from an NFT in accordance with one embodiment of the invention. The medium 300 includes a stacked structure including a glass substrate 302 at a base or bottom layer, an adhesion layer 304 on the glass substrate 302, a heatsink layer 306 on the adhesion layer 304, one or more underlayers 308 on the heatsink layer 306, the magnetic recording layer 310 on the underlayers 308, and the tuned coupling layer 312 on the magnetic recording layer 310. In some embodiments, the stacked structure of the medium 300 further includes a lubricant layer or carbon overcoat on the tuned coupling layer 312.

In many embodiments, the magnetic recording layer 310 is made of L10 ordered FePt, L10 ordered CoPt, and/or L10 ordered FePd. In many embodiments, the tuned coupling layer 312 is deposited using preselected parameters such as a preselected temperature and a preselected thickness of the carbon layer, where the carbon layer has an extinction coefficient (k) greater than 0.1 for a range of wavelengths expected for a light source applied to a nearby NFT. In several embodiments, the tuned coupling layer is made of one or more preselected materials such as Ta, Pt, Ru, Ag, Au, Cu, Al, NiTa, C, SiC, SiN, TiC, TiN, and/or other suitable materials. In some embodiments, the tuned coupling layer 312 is deposited using sputter deposition.

In some embodiments, the preselected temperature is in a range from about 90 degrees Celsius to about 150 degrees Celsius, and the preselected thickness is in a range from about 1.5 nanometers (nm) to about 8 nm. In one such embodiment, the preselected thickness of the tuned coupling layer is about 5 nm. In one embodiment, the density of the tuned coupling layer 312 (e.g., flash carbon in one aspect) is in a range from about 1.5 grams per centimeter cubed or g/cm$^3$ to about 1.7 g/cm$^3$. In one embodiment, the density of the tuned coupling layer 312 (e.g., flash carbon in one aspect) is less than that of the CVD carbon found in the comparative HAMR media. In several embodiments, the extinction coefficient of the tuned coupling layer 312 (e.g., flash carbon in one aspect) is greater than that of the CVD carbon found in the comparative HAMR media.

In several embodiments, the tuned coupling layer 312 is configured to efficiently couple light energy from a nearby NFT of a HAMR system. In one such embodiment, the tuned coupling layer (e.g., flash carbon layer in one aspect) has characteristics to facilitate light energy absorption from the NFT, where the characteristics include a refractive index (n) in a range from about 2 to about 2.3. In another such embodiment, at a wavelength of light applied to the media of greater than about 600 nanometers or nm (e.g., 830 nm in one aspect), the refractive index (n) is equal to about 2.3 and the extinction coefficient (k) is equal to about 0.5. In another embodiment, the wavelength of light applied to the media is in a range from about 600 nm to about 1200 nm. In one embodiment, the wavelength of light applied to the media can be greater than 800 nm.

In some embodiments, the magnetic recording layer includes FePtXY, CoPtXY and/or FePdXY, where X is selected from the group including Ag, Cu, Ni, BN, B, SiO2, SiN, SiC, and/or C, and where Y is selected from the group including ZrO2, TiO2, MgO, ZrO2, Cr2O3, Ta2O5, NbO5, HfO2, WO3, Y2O3, B2O3, and/or Al2O3.

In some embodiments, the medium 300 further includes a soft magnetic underlayer between the heatsink layer 306 and the adhesion layer 304. In one embodiment, the medium 300 further includes a soft magnetic underlayer between the underlayer and the heatsink layer. In one embodiment, the medium 300 can include a capping layer positioned between the tuned coupling layer 312 and the magnetic recording layer 310.

In several embodiments, the medium 300 further includes a thin protective layer of low density carbon (e.g., with a thickness of about 7 Angstroms) on or directly on the tuned coupling layer 312, or another suitable layer acting as a protective overcoat. In several embodiments, the thickness of the tuned coupling layer 312 can be kept to a minimum to maximize head to media spacing.

In several embodiments, all layers of the medium 300 are formed using sputtering. However, in other embodiments, the deposition of such layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

In several embodiments, the materials for the glass substrate 302, the adhesion layer 304, the heatsink layer 306, and the underlayers 308 can be those materials that are well known in the art for these layers.

In one embodiment, for example, the substrate can be made of one or more materials such as an Al alloy, NiP plated Al, glass, glass ceramic, and/or combinations thereof. In one embodiment, the adhesion layer can includes one or more materials such as CrTi, CrTa, NiTa, CoCrTaZr, CoFeZrBCr, CoTaZr, CoFeTaZr, CoCrWTaZr, CoCrMoTaZr, CoZrWMo, and/or other suitable materials known in the art.

In one embodiment, the heat sink layer can be made of one or more materials such as Ag, Al, Au, Cu, Cr, Mo, Ru, W, CuZr, MoCu, AgPd, CrRu, CrV, CrW, CrMo, CrNd, NiAl, NiTa, and/or other suitable materials known in the art.

In one embodiment, the underlayers 308 include a growth layer directly below the recording layer 310, where the growth layer can be made of one or more materials such as Cr, Mo, NiAl, MgO, TiC, TiN, Ag, CrMo, Pt, Pd, Ru, and/or other suitable materials known in the art.

Figure 4:
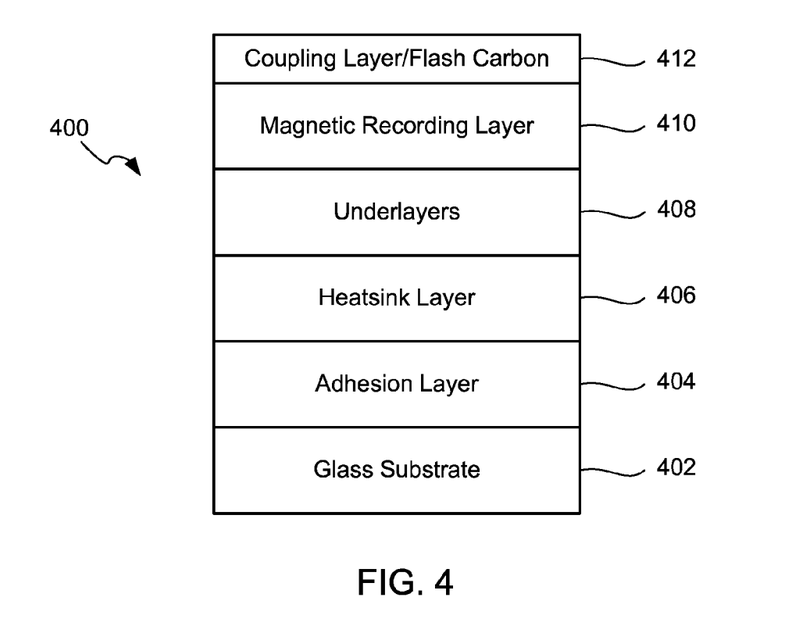
FIG. 4 is side cross sectional view of a magnetic medium with a tuned coupling layer made of flash carbon and a magnetic recording layer, where the medium is configured to efficiently couple energy from an NFT in accordance with one embodiment of the invention.

FIG. 4 is side cross sectional view of a magnetic medium 400 with a tuned coupling layer made of flash carbon 412 and a magnetic recording layer 410, where the medium 400 is configured to efficiently couple energy from an NFT in accordance with one embodiment of the invention. The medium 400 includes a stacked structure including a glass substrate 402 at a base or bottom layer, an adhesion layer 404 on the glass substrate 402, a heatsink layer 406 on the adhesion layer 404, one or more underlayers 408 on the heatsink layer 406, the magnetic recording layer 410 on the underlayers 408, and the flash carbon coupling layer 412 on the magnetic recording layer 410. In some embodiments, the stacked structure of the medium 400 further includes a lubricant layer and/or a carbon overcoat layer on the flash carbon layer 412.

In many embodiments, the magnetic recording layer 410 is made of L10 ordered FePt, L10 ordered CoPt, and/or L10 ordered FePd. In many embodiments, the flash carbon layer 412 is deposited using preselected parameters such as a preselected temperature and a preselected thickness of the carbon layer, where the carbon layer has an extinction coefficient (k) greater than 0.1 for a range of wavelengths expected for a light source applied to a nearby NFT.

In many embodiments, the medium 400 can modified in any of the ways described above for the medium 300 of FIG. 3. In one embodiment, the flash carbon layer 412 can act as both a coupling layer and a protective overcoat such that no additional overcoat layer is needed.

Figure 5:
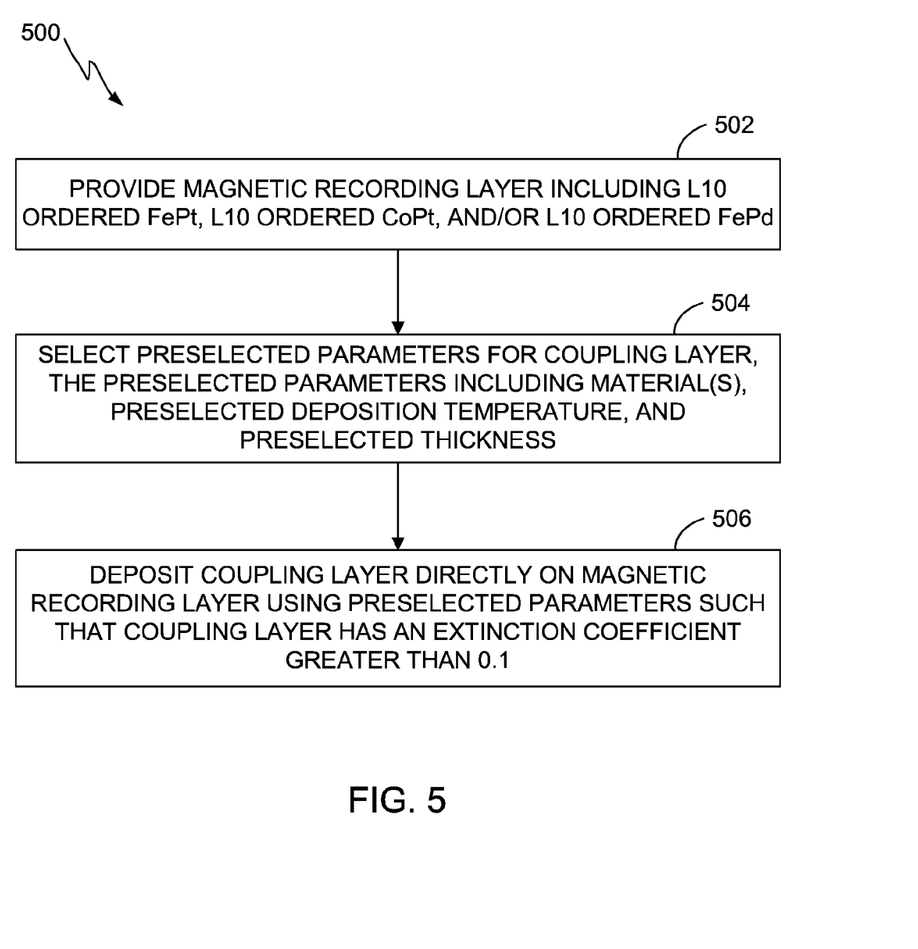
FIG. 5 is a flowchart of a process for manufacturing a magnetic medium with a tuned coupling layer on a magnetic recording layer, where the medium is configured to efficiently couple energy from an NFT in accordance with one embodiment of the invention.

FIG. 5 is a flowchart of a process 500 for manufacturing a magnetic medium with a tuned coupling layer on a magnetic recording layer, where the medium is configured to efficiently couple energy from an NFT in accordance with one embodiment of the invention. In particular embodiments, the process 500 can be used to manufacture the magnetic medium 300 of FIG. 3 or the magnetic medium 400 of FIG. 4. The process first provides (502) a magnetic recording layer including an L10 ordered FePt, an L10 ordered CoPt, and/or an L10 ordered FePd. The process then selects (504) a number of preselected parameters for the coupling layer, the preselected parameters including material(s), a preselected deposition temperature, and a preselected thickness. In several embodiments, the materials can be selected from the group including Ta, Pt, Ru, Ag, Au, Cu, Al, NiTa, C, SiC, SiN, TiC, and/or TiN. In one such case, the material is C and the coupling layer may be referred to as a flash carbon coupling layer (e.g., when sputter deposited). The process then deposits (506) the coupling layer directly on the magnetic recording layer using preselected parameters such that the coupling layer has an extinction coefficient greater than 0.1 (e.g., for a range of wavelengths expected for a light source applied to the NFT).

In several embodiments, the process can provide for additional layers or layer characteristics of the medium in the manner described above for the medium 300 of FIG. 3 or the medium 400 of FIG. 4. For example, in some embodiments, the process can also provide a glass substrate, provide an adhesion layer on the glass substrate, provide a heatsink layer on the adhesion layer, provide an underlayer on the heatsink layer, where the magnetic recording layer is on the underlayer, and provide a lubricant layer on the coupling layer. In one such embodiment, the process also provides a soft magnetic underlayer between the heatsink layer and the adhesion layer. In another such embodiment, the process also provides a soft magnetic underlayer between the underlayer and the heatsink layer.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 6A:
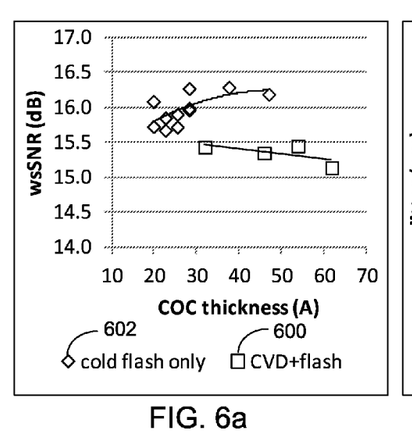
FIGS. 6a, 6b, 6c, 6d, and 6e illustrate graphs of signal to noise ratio (SNR), jitter, laser power, low frequency noise, and linear data density, respectively, showing media performance comparisons between a comparative media without a flash carbon coupling layer directly on a magnetic recording layer and a magnetic medium with a flash carbon coupling layer directly on a magnetic recording layer in accordance with one embodiment of the invention.
Figure 6B:
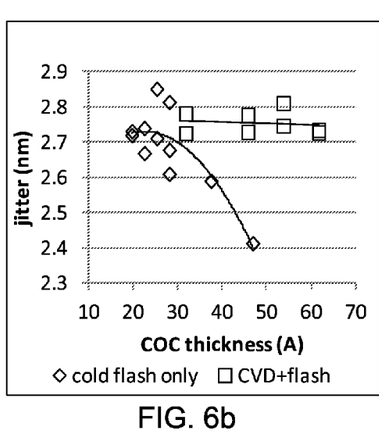
Figure 6C:
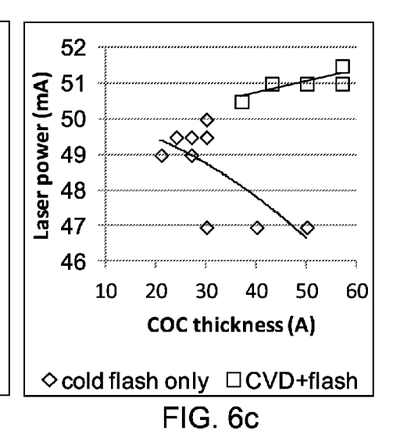
Figure 6D:
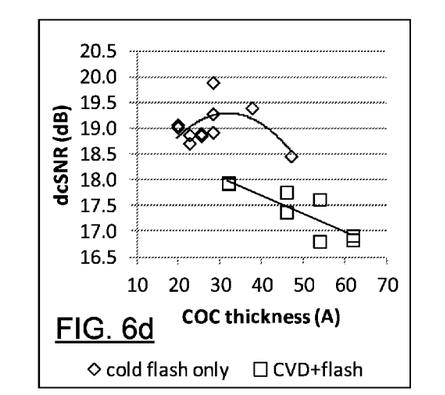
Figure 6E:
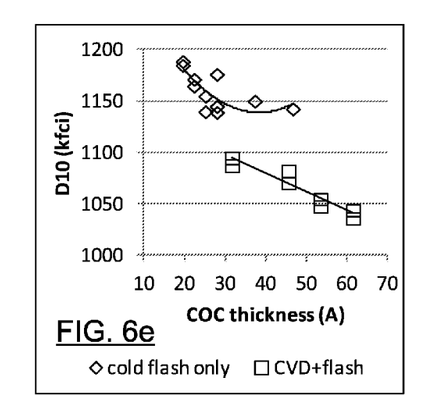

FIGS. 6a, 6b, 6c, 6d, and 6e illustrate graphs of signal to noise ratio (SNR), jitter, laser power, low frequency noise, and linear data density, respectively, showing media performance comparisons between a comparative media without a flash carbon coupling layer directly on a magnetic recording layer and a magnetic medium with a flash carbon coupling layer directly on a magnetic recording layer in accordance with one embodiment of the invention. In particular, the media 602 with the flash carbon coupling layer directly on the recording layer shows improved SNR (measured in decibels or dB and shown in FIG. 6a) and jitter (measured in nanometers or nm and shown in FIG. 6b) at reduced laser power levels (measured in milliamps or mA and shown in FIG. 6c) as compared to the comparative media 600 without the flash carbon coupling layer directly on the recording layer (e.g., with intervening CVD layer and then a flash layer). FIG. 6d illustrates the low frequency (DC) noise performance measured in dB. FIG. 6e illustrates the linear data density performance (e.g., "D10" or density at an amplitude of about 10 percent) measured in kilo flux changes per square inch or kFCI.

Taking a closer look at FIG. 6a to highlight an important observation, FIG. 6a illustrates that for the comparative media with the CVD carbon overcoat, the SNR decreases as the thickness of the CVD overcoat increases. Unexpectedly, exactly the opposite is true for media with the flash carbon coupling overcoat/layer directly on the recording layer where the media SNR actually increases as the thickness of the overcoat increases.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method for fabricating a media for heat assisted magnetic recording, the method comprising:
providing a magnetic recording layer comprising materials selected from the group consisting of an L10 ordered FePt, an L10 ordered CoPt, an L10 ordered FePd, and combinations thereof;
selecting a plurality of preselected parameters for a coupling layer, the preselected parameters comprising a material, a preselected deposition temperature, and a preselected thickness; and
depositing the coupling layer directly on the magnetic recording layer using the preselected parameters such that the coupling layer has an extinction coefficient greater than 0.1.

2. The method of claim 1, wherein the material of the coupling layer is selected from the group consisting of Ta, Pt, Ru, Ag, Au, Cu, Al, NiTa, C, SiC, SiN, TiC, TiN, and combinations thereof.

3. The method of claim 1, wherein the material of the coupling layer comprises C.

4. The method of claim 3, wherein a density of the coupling layer is in a range from about 1.5 g/cm$^3$ to about 1.7 g/cm$^3$.

5. The method of claim 3:
wherein the coupling layer is configured to efficiently couple light energy from a near field transducer (NFT) of a heat assisted magnetic recording system, wherein the NFT is positioned proximate the media; and
wherein the coupling layer comprises characteristics to facilitate light energy absorption from the NFT, the characteristics comprising a refractive index in a range from about 2 to about 2.3.

6. The method of claim 5, wherein, at a wavelength of light applied to the media of greater than about 600 nanometers, the refractive index is equal to about 2.3 and the extinction coefficient is equal to about 0.5.

7. The method of claim 3, wherein the preselected deposition temperature is in a range from about 90 degrees Celsius to about 150 degrees Celsius, and the preselected thickness is in a range from about 1.5 nanometers to about 8 nanometers.

8. The method of claim 1, wherein the preselected deposition temperature is in a range from about 90 degrees Celsius to about 150 degrees Celsius, and the preselected thickness is in a range from about 1.5 nanometers to about 8 nanometers.

9. The method of claim 1, wherein the depositing the coupling layer directly on the magnetic recording layer comprises depositing the coupling layer directly on the magnetic recording layer using sputter deposition.

10. The method of claim 1, wherein the coupling layer is configured to efficiently couple light energy from a near field transducer (NFT) of a heat assisted magnetic recording system, wherein the NFT is positioned proximate the media.

11. The method of claim 1, further comprising providing a heatsink layer, wherein the magnetic recording layer is on the heatsink layer.

12. The method of claim 1, wherein the magnetic recording layer comprises materials selected from the group consisting of FePtXY, CoPtXY, and FePdXY, where X is selected from the group consisting of Ag, Cu, Ni, BN, B, SiO2, SiN, SiC, C and combinations thereof, and where Y is selected from the group consisting of ZrO2, TiO2, MgO, ZrO2, Cr2O3, Ta2O5, NbO5, HfO2, WO3, Y2O3, B2O3, Al2O3, and combinations thereof.

13. The method of claim 1, further comprising:
providing a glass substrate;
providing an adhesion layer on the glass substrate;
providing a heatsink layer on the adhesion layer;
providing an underlayer on the heatsink layer, wherein the magnetic recording layer is on the underlayer; and
providing a lubricant layer on the coupling layer.

14. The method of claim 13, further comprising providing a soft magnetic underlayer between the heatsink layer and the adhesion layer.

15. The method of claim 13, further comprising providing a soft magnetic underlayer between the underlayer and the heatsink layer.

16. A media for heat assisted magnetic recording, the media comprising:
a magnetic recording layer comprising materials selected from the group consisting of an L10 ordered FePt, an L10 ordered CoPt, an L10 ordered FePd, and combinations thereof; and
a coupling layer directly on the magnetic recording layer and deposited using preselected parameters comprising a preselected temperature and a preselected thickness of the coupling layer,
wherein the coupling layer has an extinction coefficient greater than 0.1.

17. The media of claim 16, wherein the coupling layer comprises a material selected from the group consisting of Ta, Pt, Ru, Ag, Au, Cu, Al, NiTa, C, SiC, SiN, TiC, TiN, and combinations thereof.

18. The media of claim 16, wherein the coupling layer comprises C.

19. The media of claim 18, wherein a density of the coupling layer is in a range from about 1.5 g/cm$^3$ to about 1.7 g/cm$^3$.

20. The media of claim 18:
wherein the coupling layer is configured to efficiently couple light energy from a near field transducer (NFT) of a heat assisted magnetic recording system, wherein the NFT is positioned proximate the media; and
wherein the coupling layer comprises characteristics to facilitate light energy absorption from the NFT, the characteristics comprising a refractive index in a range from about 2 to about 2.3.

21. The media of claim 20, wherein, at a wavelength of light applied to the media of greater than about 600 nanometers, the refractive index is equal to about 2.3 and the extinction coefficient is equal to about 0.5.

22. The media of claim 18, wherein the preselected temperature is in a range from about 90 degrees Celsius to about 150 degrees Celsius, and the preselected thickness is in a range from about 1.5 nanometers to about 8 nanometers.

23. The media of claim 16, wherein the preselected temperature is in a range from about 90 degrees Celsius to about 150 degrees Celsius, and the preselected thickness is in a range from about 1.5 nanometers to about 8 nanometers.

24. The media of claim 16, wherein the coupling layer is deposited using sputter deposition.

25. The media of claim 16, wherein the coupling layer is configured to efficiently couple light energy from a near field transducer (NFT) of a heat assisted magnetic recording system, wherein the NFT is positioned proximate the media.

26. The media of claim 16, further comprising a heatsink layer, wherein the magnetic recording layer is on the heatsink layer.

27. The media of claim 16, wherein the magnetic recording layer comprises materials selected from the group consisting of FePtXY, CoPtXY, and FePdXY, where X is selected from the group consisting of Ag, Cu, Ni, BN, B, SiO2, SiN, SiC, C, and combinations thereof, and where Y is selected from the group consisting of ZrO2, TiO2, MgO, ZrO2, Cr2O3, Ta2O5, NbO5, HfO2, WO3, Y2O3, B2O3, Al2O3, and combinations thereof.

28. The media of claim 16, further comprising:
a glass substrate;
an adhesion layer on the glass substrate;
a heatsink layer on the adhesion layer;
an underlayer on the heatsink layer, wherein the magnetic recording layer is on the underlayer; and
a lubricant layer on the coupling layer.

29. The media of claim 28, further comprising a soft magnetic underlayer between the heatsink layer and the adhesion layer.

30. The media of claim 28, further comprising a soft magnetic underlayer between the underlayer and the heatsink layer.

31. A heat assisted magnetic recording system comprising:
the media of claim 16;
a slider comprising a near field transducer (NFT), wherein the coupling layer is configured to efficiently couple light energy from the NFT; and
a light source coupled to the slider and configured to emit light to the NFT, wherein the NFT is configured to direct the light energy on the media.

* * * * *